US008532401B2

(12) United States Patent
Kato et al.

(10) Patent No.: US 8,532,401 B2
(45) Date of Patent: Sep. 10, 2013

(54) IMAGE PROCESSING APPARATUS, IMAGE PROCESSING METHOD, AND COMPUTER-READABLE MEDIUM AND COMPUTER DATA SIGNAL

(75) Inventors: Noriji Kato, Kanagawa (JP); Takashi Isozaki, Tokyo (JP); Motofumi Fukui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 841 days.

(21) Appl. No.: 12/499,857

(22) Filed: Jul. 9, 2009

(65) Prior Publication Data

US 2010/0014756 A1  Jan. 21, 2010

(30) Foreign Application Priority Data

Jul. 9, 2008 (JP) ................................. 2008-178682

(51) Int. Cl.
 *G06K 9/68* (2006.01)
(52) U.S. Cl.
 USPC ............................ 382/225; 382/132; 382/173
(58) Field of Classification Search
 USPC ................................. 382/131–132, 173, 225
 See application file for complete search history.

(56) References Cited

U.S. PATENT DOCUMENTS

| | | | |
|---|---|---|---|
| 6,466,687 B1 * | 10/2002 | Uppaluri et al. | 382/128 |
| 8,045,773 B2 * | 10/2011 | Lautenschlager | 382/128 |
| 2003/0103665 A1 * | 6/2003 | Uppaluri et al. | 382/131 |
| 2004/0101176 A1 * | 5/2004 | Mendonca et al. | 382/128 |
| 2007/0081712 A1 * | 4/2007 | Huang et al. | 382/128 |
| 2009/0087059 A1 * | 4/2009 | Moriya | 382/131 |
| 2009/0177651 A1 * | 7/2009 | Takamatsu et al. | 707/5 |
| 2009/0214096 A1 * | 8/2009 | Andrushkiw et al. | 382/131 |
| 2009/0232376 A1 * | 9/2009 | Raundahl et al. | 382/131 |
| 2010/0003689 A1 * | 1/2010 | Hoon et al. | 435/6 |

FOREIGN PATENT DOCUMENTS

| | | |
|---|---|---|
| JP | 2004-174254 A | 6/2004 |
| JP | 2006-14967 A | 1/2006 |
| JP | 2006344242 A | 12/2006 |
| JP | 2008035286 A | 2/2008 |

OTHER PUBLICATIONS

Carrivick et al. Unsupervised learning in radiology using novel latent variable models:, IEEE 2005 Computer Conference on Computer Vision and Patter Recognition vol. 2, pp. 854-859.*

Office Action issued by Japanese Patent Office in corresponding Japanese Application No. 2008-178682, dated Dec. 18, 2012.

David M. Blei et al., "Latent Dirichlet Allocation", Journal of Machine Learning Research 3, 2003, pp. 993-1022, vol. 3.

Renuka Uppaluri et al., "Computer Recognition of Regional Lung Disease Patterns", American Journal of Respiratory and Critical Care Medcine, 1999, pp. 648-654, vol. 160.

* cited by examiner

*Primary Examiner* — Jingge Wu
(74) *Attorney, Agent, or Firm* — Sughrue Mion, PLLC

(57) ABSTRACT

An image processing apparatus includes a dividing unit, a first extracting unit, a quantizing unit, a generating unit and an image output unit. The dividing unit divides an object image into regions. The first extracting unit extracts image features of the regions generated by the dividing unit. The quantizing unit quantizes the image features extracted by the first extracting unit. The generating unit generates an expected value of an occurrence probability of each topic variable indicating similar images from the image features quantized by the quantizing unit, using a correlation between the image features quantized by the quantizing unit and the topic variables. The image output unit outputs an image of a defective portion in the object image, using the expected values of the occurrence probabilities of the topic variables generated by the generating unit.

7 Claims, 7 Drawing Sheets

IMAGE PROCESSING APPARATUS, IMAGE PROCESSING METHOD, AND COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-178682 filed on Jul. 9, 2008.

BACKGROUND

1. Technical Field

The invention relates to an image processing apparatus, an image processing method, a computer-readable medium storing a program that causes a computer to execute image processing and a computer data signal embedded with the program.

2. Related Art

Identifying a defective portion from an image is performed to, for example, determine a pathological change portion in medical care and to find a scratch etc. in products in manufacturing facilities such as factories.

However, although imaging diagnostic apparatus such as CT (computed tomography) and MRI (magnetic resonance imaging) apparatus are useful in finding diseases, they produce a large number of (e.g., several dozens of) images in one test and hence radiologists, who are main persons engaged in diagnosis in this case, are required to do work of finding a pathological change portion from so many images. In the case of chronic lung diseases such as interstitial pneumonia and chronic obstructive lung diseases, a certain level of skill is needed to recognize a pathological change correctly.

SUMMARY

According to an aspect of the invention, an image processing apparatus includes a dividing unit, a first extracting unit, a quantizing unit, a generating unit and an image output unit. The dividing unit divides an object image into regions. The first extracting unit extracts image features of the regions generated by the dividing unit. The quantizing unit quantizes the image features extracted by the first extracting unit. The generating unit generates an expected value of an occurrence probability of each topic variable indicating similar images from the image features quantized by the quantizing unit, using a correlation between the image features quantized by the quantizing unit and the topic variables. The image output unit outputs an image of a defective portion in the object image, using the expected values of the occurrence probabilities of the topic variables generated by the generating unit.

BRIEF DESCRIPTION OF THE DRAWINGS

Exemplary embodiments of the invention will be described below in detail based on the accompanying drawings, wherein.

DETAILED DESCRIPTION

Exemplary embodiments of the invention will be hereinafter described with reference to the drawings.

Figure 1:
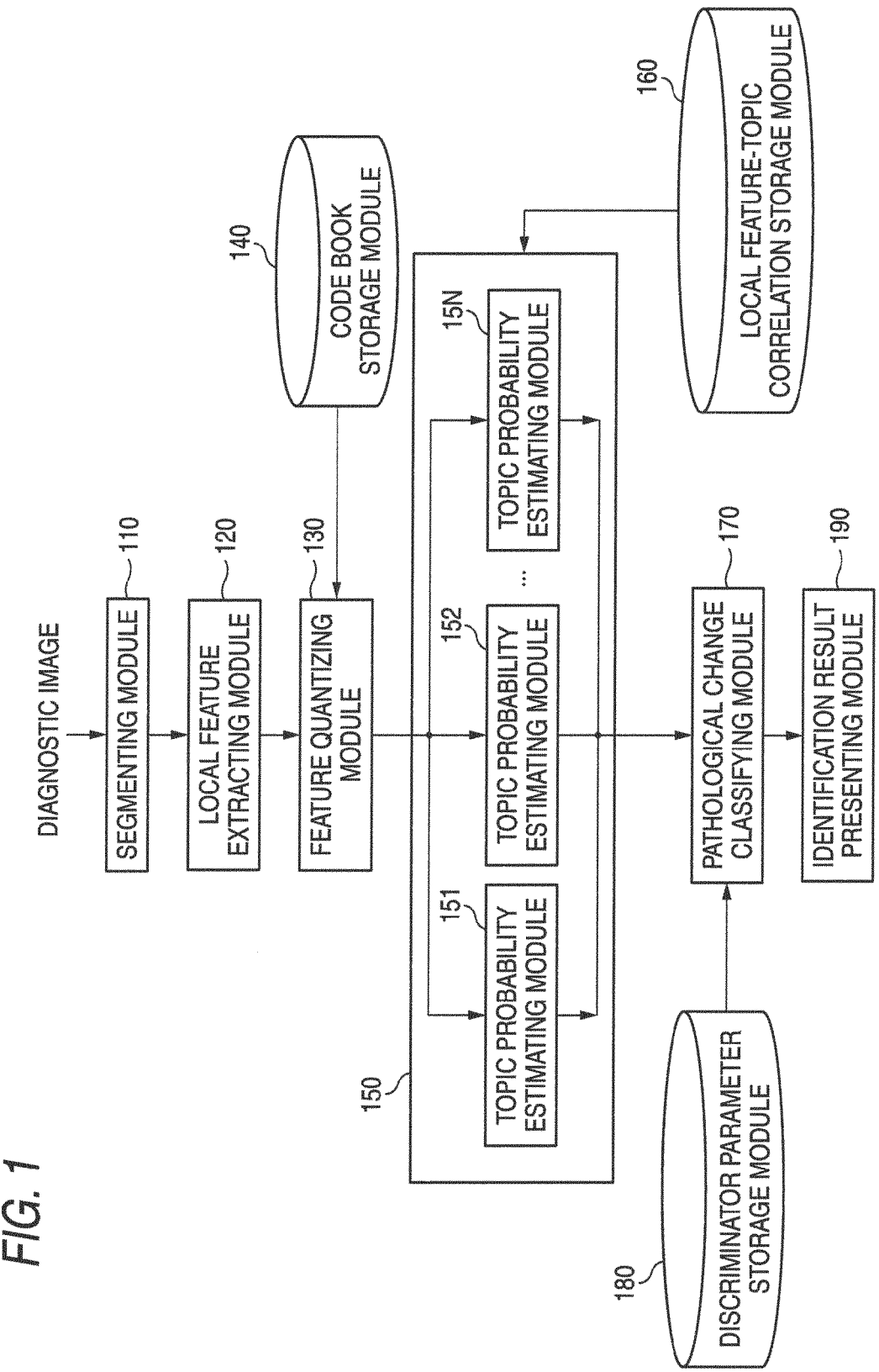
FIG. 1 shows an example configuration, that is, a conceptual module configuration, of an exemplary embodiment.

FIG. 1 shows an example configuration, that is, a conceptual module configuration, of the exemplary embodiment.

The term "module" means a software (computer program) component, a hardware component, or the like that is generally considered logically separable. Therefore, the term "module" as used in the exemplary embodiment means not only a module of a computer program but also a module of a hardware configuration. As such, the exemplary embodiment is a description of a computer program, a computer program, a system, and a method. For convenience of description, the term "to store" and terms equivalent to it will be used. Where the exemplary embodiment is intended to be a computer program, these terms mean storing information in a storage device or performing a control so that information is stored in a storage device. Modules correspond to functions almost one to one. In implementations, one module may be formed by one program. And plural modules may be formed by one program and vice versa. Plural modules may be executed by one computer, and one module may be executed by plural computer in a distributed or parallel environment. One module may include another module. In the following description, the term "connection" is used for referring to not only physical connection but also logical connection (e.g., data exchange, commanding, and a referencing relationship between data).

The term "system or apparatus" includes not only a configuration in which plural computers, pieces of hardware, devices, etc. are connected to each other by a communication means such as a network (including a one-to-one communication connection) but also what is implemented by a single (piece of) computer, hardware, device, or the like. The terms "apparatus" and "system" are used so as to be synonymous with each other. The term "predetermined" means that the item modified by this term was determined before a time point of processing concerned (i.e., before a start of processing of the exemplary embodiment) and may also mean that the item modified by this term is determined according to a current or past situation or state even in the case where the item modified by this term will be determined after a start of processing of the exemplary embodiment.

The following description will be directed to the case that a medical diagnostic image, in particular, a lung image is exemplified as an image that may include a defective portion. This exemplary embodiment is to support a doctor in making a diagnosis by identifying a pathological change portion. In particular, this exemplary embodiment is to identify even a pathological change portion in which a characteristic pattern such as a reticular pathological change or initial-stage pulmonary emphysema occupies a relatively small area. More specifically, this exemplary embodiment is to assist a doctor in making a diagnosis by determining presence/absence of a pathological change portion and a type of the pathological change based on a diagnostic image and presenting the diagnostic image with an identification result being superimposed thereon.

As shown in FIG. 1, this exemplary embodiment is equipped with a segmenting module 110, a local feature extracting module 120, a feature quantizing module 130, a code book storage module 140, a topic probability estimating module group 150, a local feature-topic correlation storage module 160, a pathological change classifying module 170, a discriminator parameter storage module 180, and an identification result presenting module 190.

The segmenting module 110 is connected to the local feature extracting module 120. In response to a manipulation (e.g., designation of a current diagnostic image) by an operator, the segmenting module 110 accepts the diagnostic image and divides it into segment images. Among the segment images, the segmenting module 110 extracts and passes ones other than normal ones to the local feature extracting module 120. The term "to accept a diagnostic image" includes reading an image with a scanner, receiving an image by facsimile, reading an image from an image database, etc. Specific examples of the "diagnostic image" are an X-ray image, a CT image, and an MRI image. And the "diagnostic image" may be either a single image or plural images.

More specifically, for example, the segmenting module 110 extracts a lung field and divides it into plural segment images so that an image feature is almost uniform in each segment image. The segmenting method is an existing method in which, for example, adjoining pixels that are similar in luminance are included in the same segment. The term "normal segment image" means a segment image in which pixel values are constant in a region having a predetermined size. Such a segment image needs not be subjected to the following processing. Alternatively, a lung field may be simply divided into rectangular segments having a fixed size.

The segmenting module 10 may be omitted; that is, the diagnostic image may be accepted by the local feature extracting module 120.

The local feature extracting module 120 is connected to the segmenting module 110 and the feature quantizing module 130. The local feature extracting module 120 divides each of the segment images (object image) extracted by the segmenting module 110, extracts an image feature of each divisional region, and passes the extracted image features of the divisional regions to the feature quantizing module 130.

More specifically, for example, the local feature extracting module 120 divides each segment image produced by the segmenting module 110 into rectangular regions (hereinafter also referred to as "local regions") having a predetermined size and calculates an image feature of each rectangular region. Examples of the image feature are a vector having, as components, luminance values of the individual pixels of a rectangular region and a texture feature using a SIFT (scale invariant feature transform) feature.

The code book storage module 140 is connected to the feature quantizing module 130 and stores information relating to clustering of a set of image features.

More specifically, for example, clustering results (i.e., center values of respective clusters) are calculated by clustering a set of image features of local regions in a predetermined pathological change image database using k-means clusters or the like, cluster numbers (for identification) are given to the respective clusters, and the cluster center values are stored in the code book storage module 140 in association with the cluster numbers. The thus-stored information is called a "quantized code book".

The feature quantizing module 130 is connected to the local feature extracting module 120, the code book storage module 140, and the topic probability estimating module group 150. The feature quantizing module 130 quantizes the image features extracted by the local feature extracting module 120 and passes the quantization results to the topic probability estimating module group 150. The feature quantizing module 130 may quantize the image features using the information relating to clustering stored in the code book storage module 140.

More specifically, for example, the feature quantizing module 130 quantizes the image features of the local regions according to the quantized code book stored in the code book storage module 140. For example, the quantization includes extracting clusters that are closest to the image features of the local regions and outputting the cluster numbers that assigned to those extracted clusters as quantization results.

The local feature-topic correlation storage module 160 is connected to the topic probability estimating module group 150 and stores a correlation between image features and a topic variable for each defect type.

More specifically, for example, the local feature-topic correlation storage module 160 stores a correlation between quantized image features of local regions and a topic variable (described later) that was learned in advance for each type or each degree of progress (including the degree of seriousness) of a pathological change.

The topic probability estimating module group 150 is connected to the feature quantizing module 130, the local feature-topic correlation storage module 160, and the pathological change classifying module 170. The topic probability estimating module group 150 is equipped with topic probability estimating modules 151, 152, . . . , 15N. The topic probability estimating module group 150 generates an expected value of an occurrence probability of each topic variable indicating similar images from the image features quantized by the feature quantizing module 130, using a correlation with the quantized image features and the topic variables. Alternatively, the topic probability estimating module group 150 may generate an expected value of an occurrence probability of each topic variable using a correlation between the topic variables and image features stored in the local feature-topic correlation storage module 160. The topic probability estimating modules 151, 152, . . . , and 15N are constructed for respective sets of similar images, in this exemplary embodiment, for respective types or the respective degrees of progress of pathological changes. Therefore, the topic probability estimating modules 151, 152, . . . , and 15N have basically the same function. In the following description, the topic probability estimating module group 150 will be described as a representative. The local feature-topic correlation storage module 160 may also be divided into modules that correspond to the respective topic probability estimating modules 151, 152, . . . , and 15N.

More specifically, for example, the topic probability estimating module group 150 acquires a correlation between each topic variable and local image features stored in the local feature-topic correlation storage module 160 and estimates a topic probability from a set of quantized image features of local images using the acquired correlation information. A topic probability is estimated for each of topics that are prepared for the respective types or degrees of progress of pathological changes, and a vector having all the estimated topic probabilities as components will be used as a feature quantity for classification of pathological changes and their degrees of progress.

The discriminator parameter storage module 180 is connected to the pathological change classifying module 170 and stores parameters that were learned by using, as teacher data, pathological change images and corresponding diagnostic results that were prepared in advance. These parameters are used by the pathological change classifying module 170.

The pathological change classifying module 170 is connected to the topic probability estimating module group 150, the discriminator parameter storage module 180, and the identification result presenting module 190. The pathological change classifying module 170 determines an image of a defective portion of the diagnostic image using the expected values of the occurrence probabilities of the topic variables generated by the topic probability estimating module group 150 and passes it to the identification result presenting module 190. Alternatively, the pathological change classifying module 170 may determine an image of a defective portion of the diagnostic image using the parameters stored in the discriminator parameter storage module 180. As a further alternative, the pathological change classifying module 170 may determine presence/absence of a pathological change portion and a type and the degree of progress of the pathological change. For example, the classification may be performed by using a discriminator such as a support vector machine.

The identification result presenting module 190 is connected to the pathological change classifying module 170 and outputs an identification result (the image of the defective portion) of the pathological change classifying module 170. The term "to output" includes printing with a printer, display on a display device, transmission with a facsimile machine, writing to an image database, etc. More specifically, for example, the identification result presenting module 190 displays the image of the defective portion with the image of the defective portion being superimposed on the diagnostic image with different colors.

Figure 2:
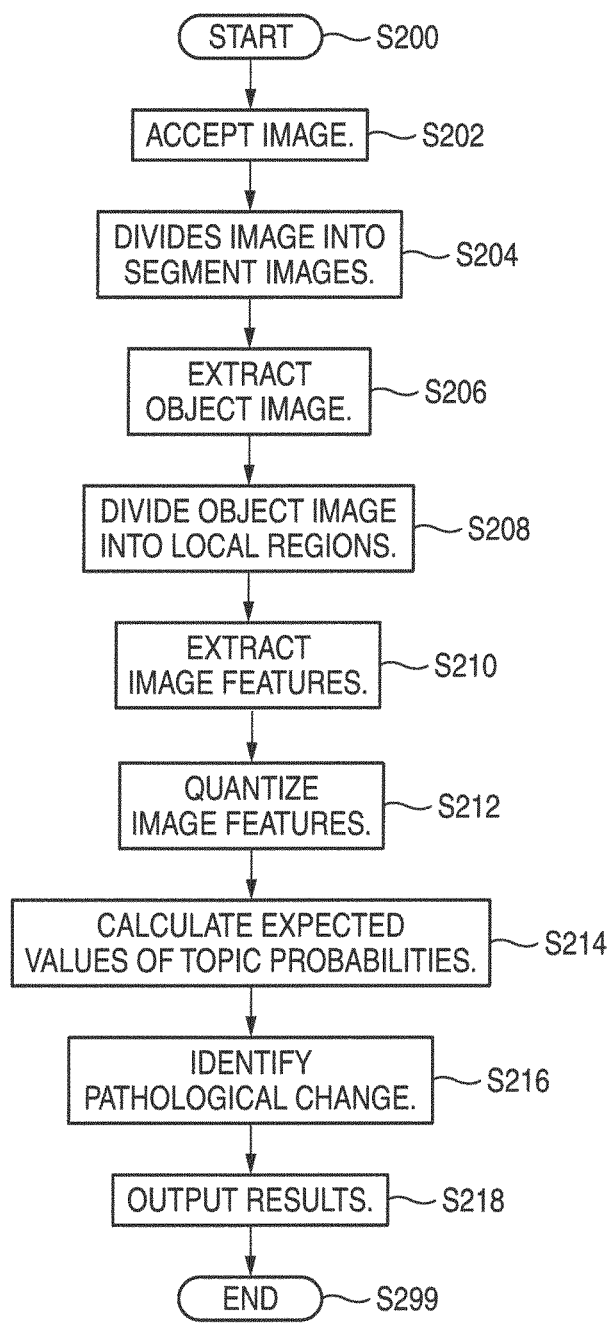
FIG. 2 is a flowchart of an example process of the exemplary embodiment.

FIG. 2 is a flowchart of an example process of the exemplary embodiment.

At step S202, the segmenting module 110 accepts a diagnostic image.

At step S204, the segmenting module 110 divides the diagnostic image into segment images.

At step S206, the segmenting module 110 extracts, from the segment images, ones other than normal ones. The extracted segment images are employed as an object image.

At step S208, the local feature extracting module 120 divides the object image into local regions.

At step S210, the local feature extracting module 120 extracts image features from the respective local regions.

At step S212, the feature quantizing module 130 quantizes the image features using the code book storage module 140. That is, the feature quantizing module 130 assigns cluster numbers to the respective local regions.

At step S214, the topic probability estimating module group 150 calculates expected values of topic probabilities.

At step S216, for example, the pathological change classifying module 170 identifies a pathological change using the expected values of topic probabilities.

At step S218, the identification result presenting module 190 outputs identification results (e.g., presence/absence of a pathological change and its location) to a display device, for example.

Next, the "topic variable" will be described. In this exemplary embodiment, the term "topic variable" means a group of similar images. For example, the term "topic variable" means a group of similar images of each pathological change or each degree of progress. Such a group of images corresponds to a name of one type of pathological change or one of subclasses that are generated by image variation that is associated with the degrees of progress.

Figure 3:
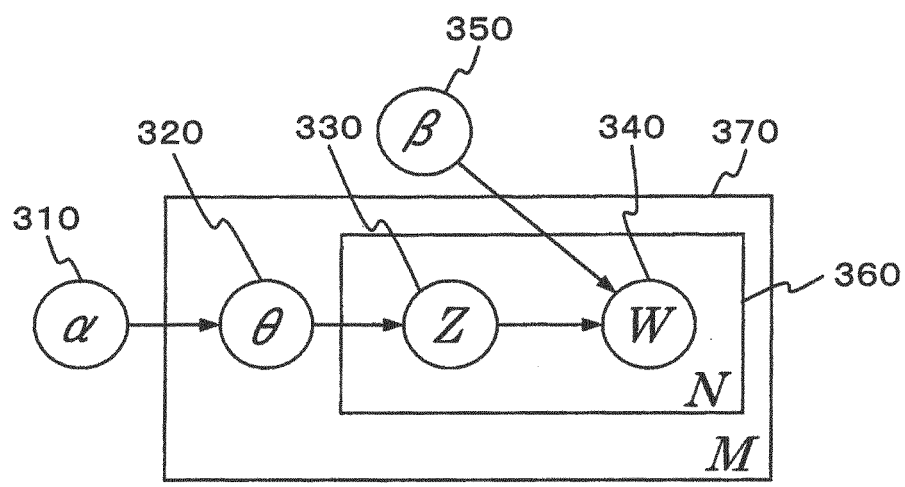
FIG. 3 illustrates an LDA model.

To learn a pathological change name or a subclass from feature quantities of regions, an example generation model as shown in FIG. 3 is used. As described later, the probability that a topic variable generates a local feature is determined by learning by using a set of feature quantities of regions. As a result of the learning, local feature quantities that occur together in the same region at a high probability come to belong to one topic variable. Although topic variables themselves are latent variables that cannot be observed, an expected value of an occurrence probability of each topic variable can be calculated for segments.

A specific example of the generation model is a latent Dirichlet allocation model (LDA model) which is described in D. Blei, A. Ng, and M. Jordan, "Latent Dirichlet Allocation," Journal of Machine Learning Research, Vol. 3, pp. 993-1,022, 2003. The LDA model is a model that represents a process of generating, from topics, a document which is a set of words. The LDA model is also a model that is used for extracting topics (in this case, what is called subject matters) expressed by a document from the words included in the document. It is assumed that the occurrence probability of each topic has a multinomial distribution in which the prior probability has a Dirichlet distribution.

In the example model of FIG. 3, a topic occurrence probability θ 320 is selected for a certain document from a Dirichlet distribution having a parameter α 310, N topics Z 330 are generated from a multinomial distribution that is based on the θ 320, and words 340 are generated from each topic. M 370 represents the number of documents in a corpus. N 360 represents the number of words in one document. β 350 represents an occurrence probability of words when a topic is determined.

In this exemplary embodiment to which the LDA model is applied, quantized image features of local regions correspond to words, and one diagnostic image corresponds to one document. That is, occurrence probabilities of respective topics are determined for one diagnostic image, topics occur for each local region according to the thus-determined occurrence probabilities, and image features of local regions are independently generated based on the topics. The model includes the parameter α 310 of the Dirichlet distribution and the probability β 350 for generating a local feature from each topic, which are learned by giving plural regions to the model. The likelihood can be defined for plural regions as the following Formula 1:

$$P(W \mid \alpha, \beta) = \frac{\Gamma\left(\sum_i \alpha_i\right)}{\prod_i \Gamma(\alpha_i)} \int \left(\prod_{i=1}^k \theta^{\alpha_i - 1}\right)\left(\prod_{n=1}^N \prod_{i=1}^k \prod_{j=1}^V (\theta_i \beta_{ij})^{\delta_{nj}}\right) d\theta \quad \text{[Formula 1]}$$

The parameters α 310 and β 350 are determined by maximizing this likelihood. The maximizing method may be a variation Bayes method or a Monte Carlo method. On the other hand, an expected value of an occurrence probability of each topic can be calculated for the accepted region by using the learned parameters α 310 and β 350. The calculated expected value of the occurrence probability is used as a feature quantity of the region. That is, the topic probability estimating module group 150 calculates an expected value of an occurrence probability that maximizes the likelihood that is represented by Formula 1.

Figure 4:
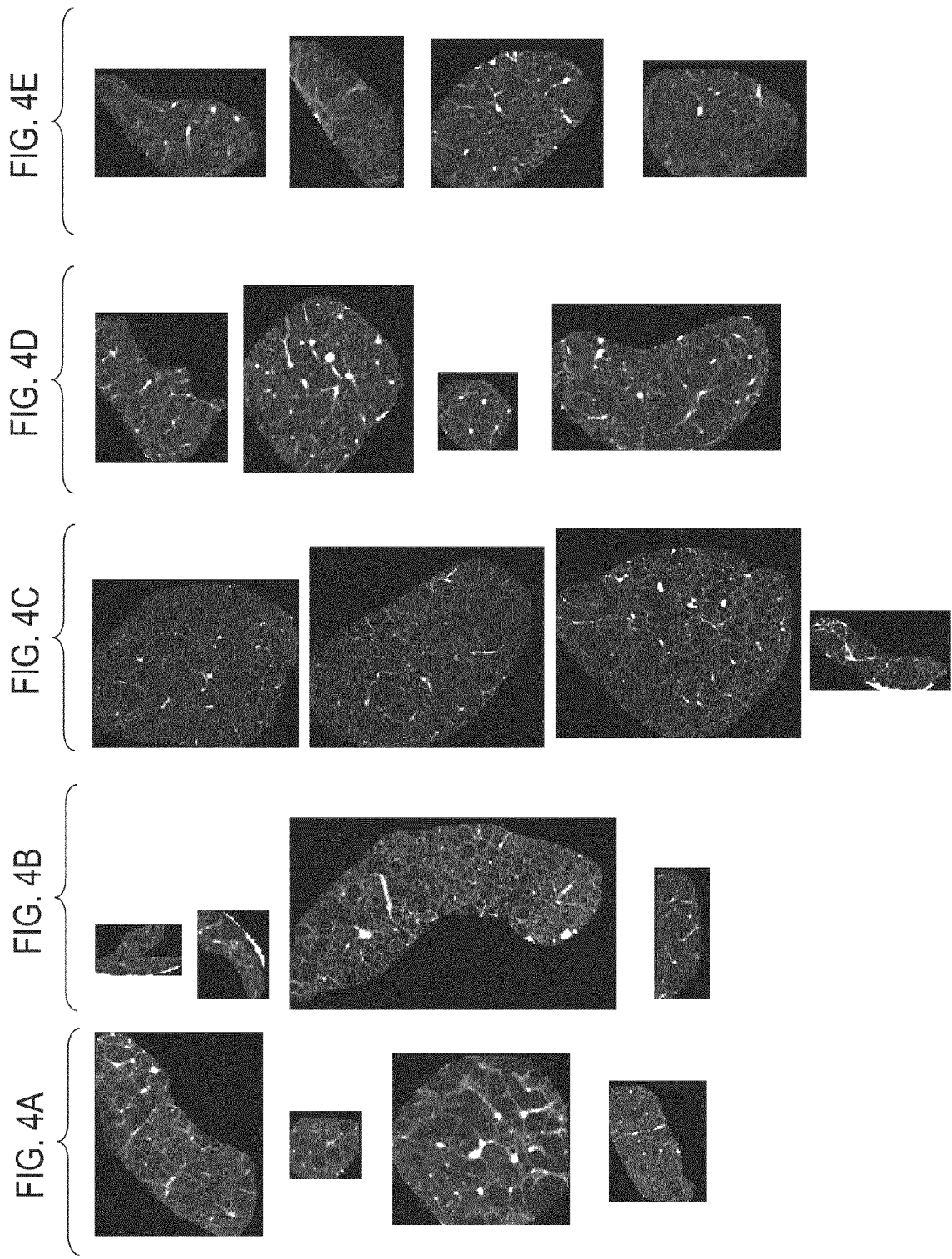
FIGS. 4A to 4E each shows a typical example pathological change image belonging to a topic.

A description will be made of properties of a feature quantity that uses a topic of the LDA model and is calculated by the above-described method. FIGS. 4A to 4E each show typical example images belonging to a topic that is obtained by learning for a pathological change of pulmonary emphysema. FIG. 4A shows a collection of images of topic 1, FIG. 4B shows a collection of images of topic 2, and so forth. It is seen that sub-clusters are learned that are different from each other in the degree of progress, that is, in the degree of destruction of alveoli. An alveolus-destroyed portion is low in luminance (dark). For example, topic 3 (FIG. 4C), in which low-luminance regions are dispersed in a normal portion, corresponds to a pathological change at a relatively early stage. Topic 5 (FIG. 4E) corresponds to a state that because of progress of the disease, low-luminance regions are combined together and almost no normal portions are found. The other topics correspond to intermediate states.

Figure 5:
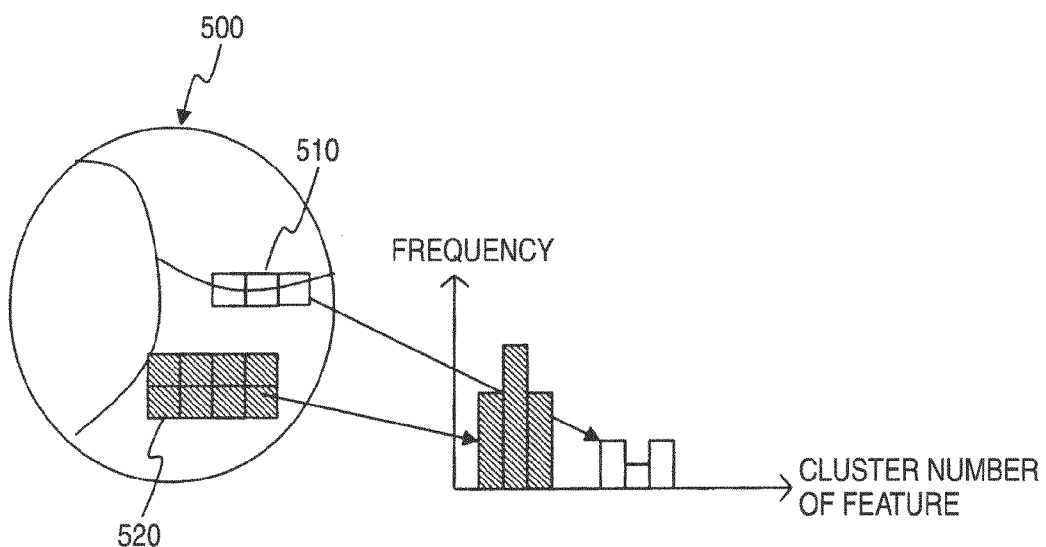
FIG. 5 illustrates an example frequency distribution of features in the case that a pathological change image is divided into local regions.
Figure 6:
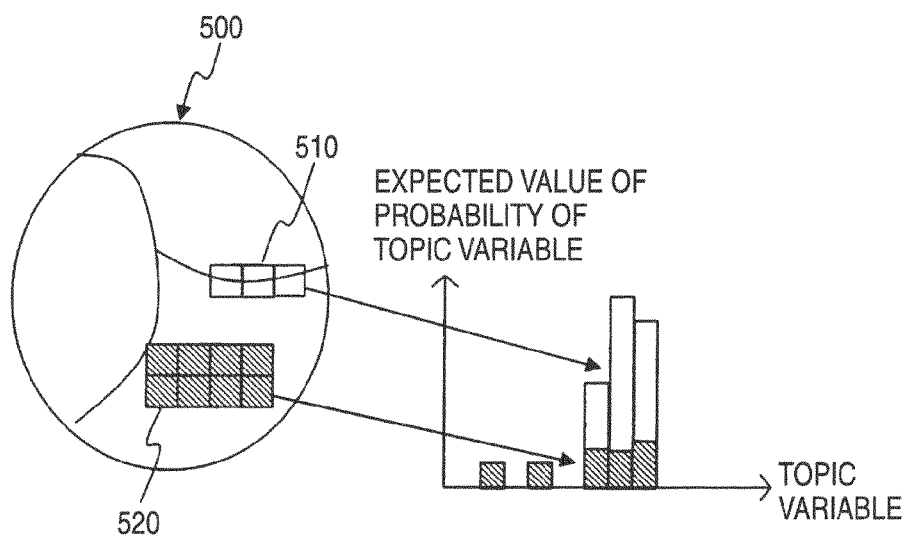
FIG. 6 illustrates an example distribution of expected values of probabilities of topic variables for a pathological change image.

FIG. 5 illustrates an example frequency distribution of features in the case that a pathological change image is divided into local regions. FIG. 6 illustrates an example distribution of expected values of probabilities of topic variables for a pathological change image.

A description will be made of what feature quantities are obtained when a reticular image 500 shown in the example of FIG. 5 (or FIG. 6) is accepted. In the image 500, linear portions and a background are mixed with each other. If this is processed by using only feature quantities without using topics of the LDA model, a result would be as indicated by the graph shown on the right-hand part of FIG. 5. The horizontal axis of this graph represents the cluster number of an image feature, and the vertical axis thereof represents the frequency. That is, this graph shows a distribution of the numbers of local regions having certain image features.

In this case, the number of local regions having image features that are calculated from the background (background image regions 520) is larger than that of local regions having image features that are calculated from the linear portions (pathological change image regions 510). Since portions that are important in identifying a reticular image are linear portions, the identification performance would be low if no further measure were taken.

In contrast, in this exemplary embodiment, the contribution of the linear portions is higher than that of the background, the reason for which will be described below.

The number of topics in the LDA model is five, for example, and the number of quantized image features of local regions is about 100 to 300, for example; that is, the former is smaller than the latter. Therefore, to generate a distribution of image features of local regions that are quantized by using topics that are smaller in number (hereinafter also referred to as "quantized local features"), learning is performed so that quantized local features that would occur together in a single pathological change at a high probability are generated by using the same topic. In the case of a reticular pathological change, local features of linear portions tend to occur together and hence to belong to the same topic. On the other hand, local features of a background are irrelevant to a pathological change and occur relatively randomly (i.e., they would occur together only at a low probability). Therefore, a data distribution can be expressed more efficiently by generating local features of a background uniformly using plural topics rather than a particular topic. As a result, whereas linear local features have high occurrence probabilities for a particular topic of the LDA model, local features of a background have uniform, low occurrence probabilities for all topics.

Therefore, in the exemplary embodiment, the contribution of linear portions is higher than a background and the identification rate is increased.

Figure 7:
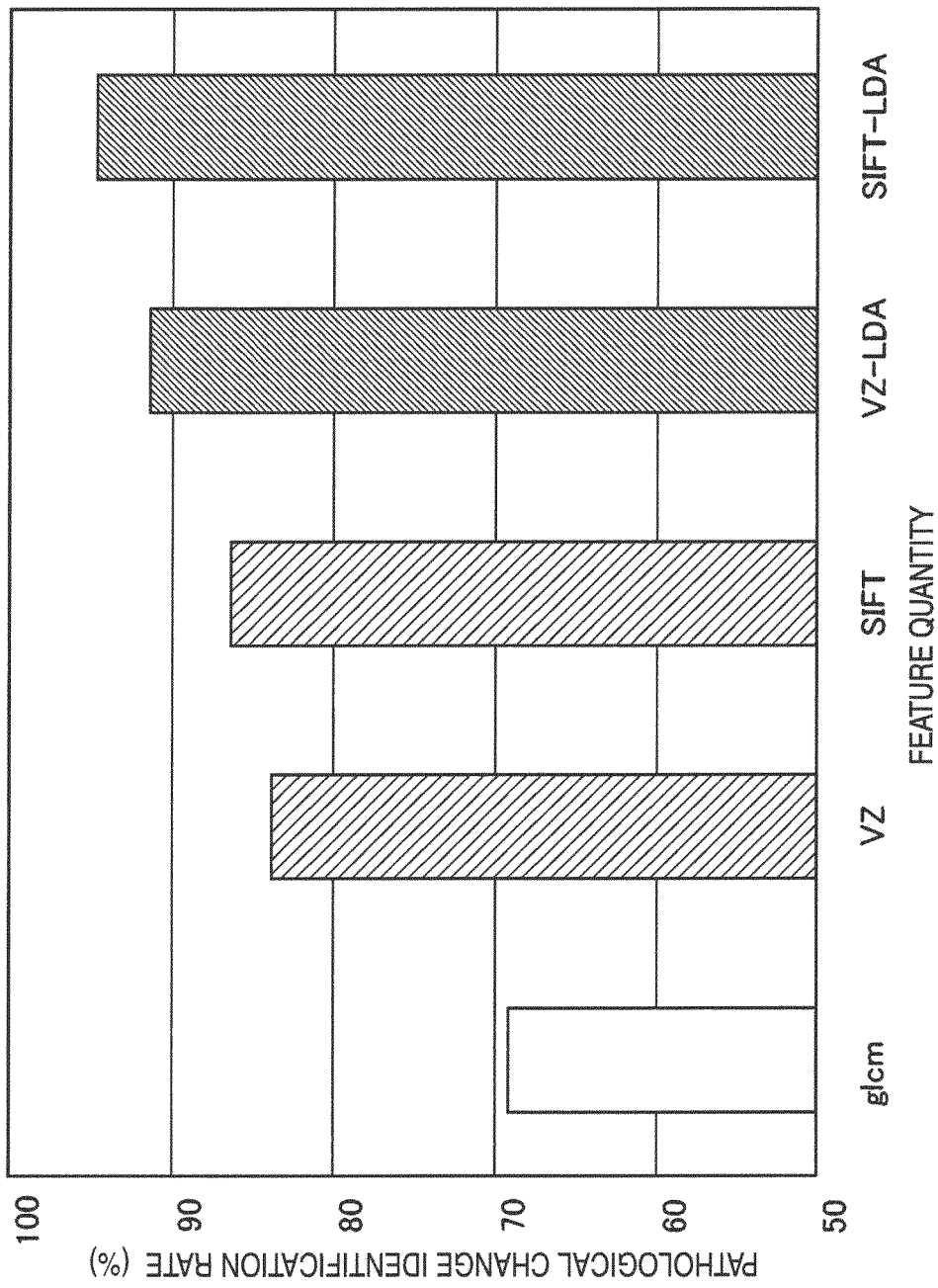
FIG. 7 is a graph comparing example experimental results of identification performance.

FIG. 7 is a graph comparing example experimental results of identification performance, that is, pathological change identification rates of the exemplary embodiment and a conventional case.

In FIG. 7, "glcm," "VZ," "SIFT" indicate cases in which a luminance correlation matrix, a luminance vector, and SIFT descriptors were used for image features of local regions, respectively. "VZ-LDA" and "SIFT-LDA" indicate processing results of the exemplary embodiment. It is seen that high identification performance can be secured even in cases that characteristic patterns occupy a relatively small area as in the case of a reticular pathological change, initial-stage pulmonary emphysema, etc.

Figure 8:
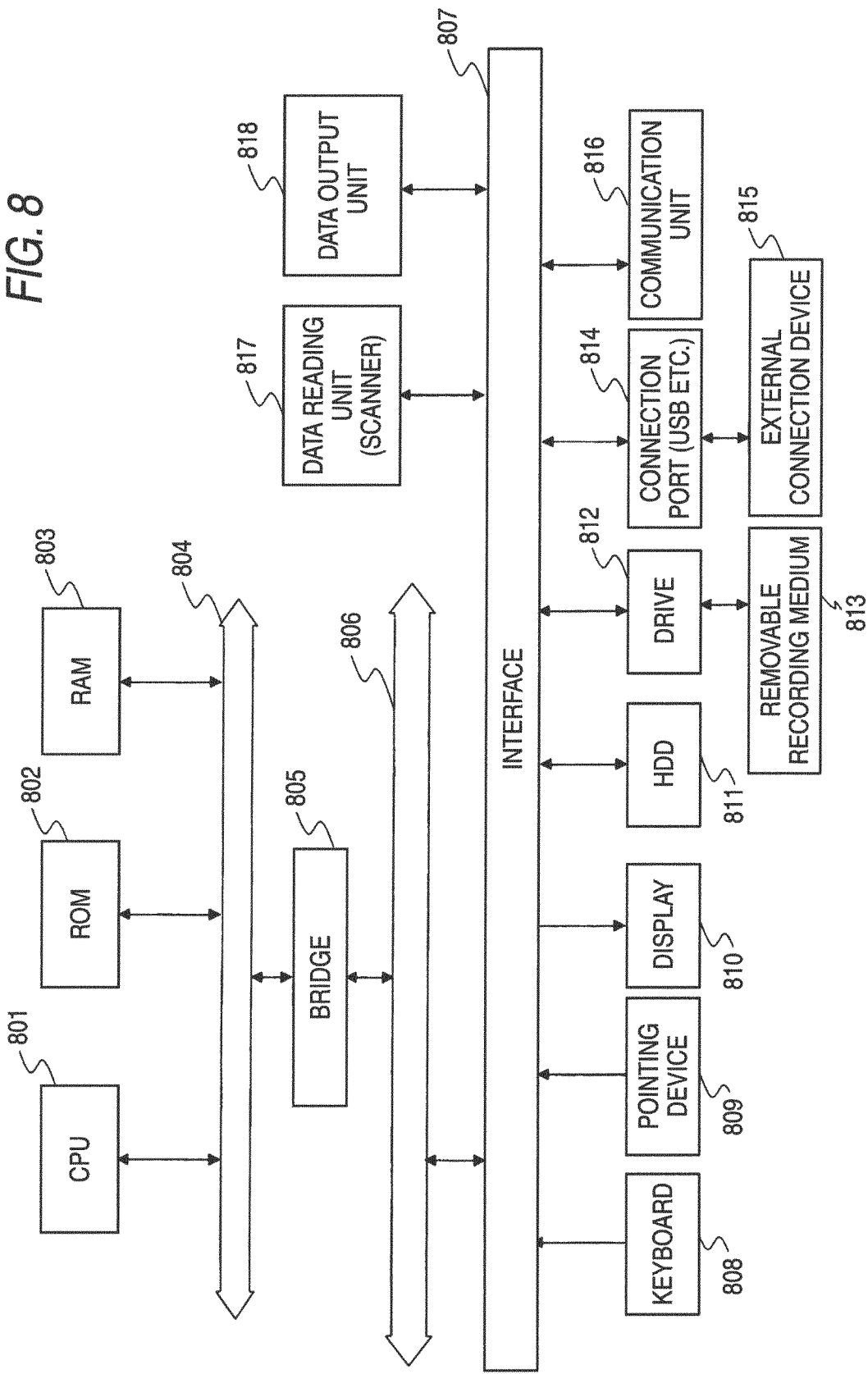
FIG. 8 is a block diagram showing an example hardware configuration of a computer that constitutes the exemplary embodiment.

An example hardware configuration of the exemplary embodiment will be described below with reference to FIG. 8. The hardware configuration of FIG. 8 is implemented by a personal computer (PC), for example, and is equipped with a data reading unit 817 such as a scanner and a data output unit 818 such as a printer.

A CPU (central processing unit) 801 is a control section which executes processes corresponding to computer programs that describe execution sequences of the above-described various modules of the exemplary embodiment such as the segmenting module 110, the local feature extracting module 120, the feature quantizing module 130, and the topic probability estimating module group 150.

A ROM (read-only memory) 802 stores programs, calculation parameters, etc. to be used by the CPU 801. A RAM (random access memory) 803 stores a program to be run by the CPU 801 and parameters etc. that vary as the program is run. The CPU 801, the ROM 802, and the RAM 803 are connected to each other by a host bus 804 which is a CPU bus, for example.

The host bus 804 is connected to an external bus 806 such as a PCI (peripheral component interconnect/interface) bus via a bridge 805.

A keyboard 808 and a pointing device 809 such as a mouse are input devices that are manipulated by an operator. A display 810, which is a liquid crystal display device, a CRT (cathode-ray tube) display, or the like, displays various kinds of information in the form of a text or image information.

An HDD (hard disk drive) 811 drives hard disks incorporated therein and records and reproduces programs to be run by the CPU 801 and related information. Accepted diagnostic images, a code book, etc. are stored on the hard disks. Other various computer programs such as various data processing programs are also stored on the hard disks.

A drive 812 reads out data or a program that is recorded on a removable recording medium 813 inserted therein such as a magnetic disk, an optical disc, a magneto-optical disc, or a semiconductor memory, and supplies the read-out data or program to the RAM 803 via an interface 807, the external bus 806, the bridge 805, and the host bus 804. The removable recording medium 813 can be used as a data recording area similar to the one provided by the hard disks.

Connection ports 814 are ports to which an external connection device 815 is to be connected, and have connection terminals of USB, IEEE 1394 etc. The connection ports 814 are connected to the CPU 801 etc. via the interface 807, the external bus 806, the bridge 805, and the host bus 804. A communication unit 816, which is connected to a network, performs processing for a data communication with the outside. The data reading unit 817, which is a scanner, for example, performs processing of reading a document. The data output unit 818, which is a printer, for example, performs processing of outputting document data.

The hardware configuration of FIG. 8 is just an example, and the hardware configuration of the exemplary embodiment is not limited to it and may be any configuration as long as the modules described above can be executed. For example, part of the modules may be implemented as dedicated hardware (e.g., an application-specific integrated circuit (ASIC)). Part of the modules may be provided in an external system and connected by a communication line. Plural systems each having the configuration of FIG. 8 may be connected to each other by communication lines so as to cooperate with each other. Furthermore, the configuration of FIG. 8 may be incorporated in a copier, a facsimile machine, a scanner, a printer, a multifunction machine (i.e., an image processing apparatus having at least two of scanner, printer, copier, and facsimile functions and other functions), or the like.

Although the exemplary embodiment is directed to the process for identifying a pathological change portion in a medical diagnostic image, the invention can also be applied to a process for finding a scratch etc. in shot images of products or the like in a manufacturing facility such as a factory. In particular, the invention can be applied to detection of a linear crack or the like.

Although the exemplary embodiment has been described by using the formula, the invention encompasses a case of using a thing that is equivalent to the formula. Examples of the thing equivalent to the formula are a modified version of the formula whose degree of modification is such as not to influence a final result and an algorithmic solution of the formula.

The above-described program may be provided either being stored on a recording medium or being supplied via a communication means. In the former case, the above-described program may be considered an invention of a "computer-readable recording medium on which the program is recorded."

The term "computer-readable recording medium on which the program is recorded" means one that is used for installation, execution, distribution, or the like of the program.

For example, the recording medium includes digital versatile discs (DVDs) that comply with the standards DVD-R, DVD-RW, DVD-RAM etc. that were settled on by the DVD Forum, DVDs that comply with the standards DVD+R, DVD+RW, etc. that were settled on by the DVD+RW Alliance, compact discs (CDs) such as a CD-ROM (read-only memory), a CD-R (recordable), and a CD-RW (rewritable), a Blu-ray Disc, a magneto-optical disk (MO), a flexible disk (FD), a magnetic tape, a hard disk, a read-only memory (ROM), an electrically erasable and rewritable (programmable) read-only memory (EEPROM), a flash memory, a random access memory (RAM), etc.

For example, the above-described program or part of it may be stored or distributed in a state that it is recorded in the above-described recording medium. The above-described program or part of it may be transmitted by a communication over a transmission medium such as a wired network, a wireless communication network or a combination thereof used for a local area network (LAN), a metropolitan area network (MAN), a wide area network (WAN), the Internet, an intranet, or the like. And the above-described program or part of it may be transmitted being carried by a carrier wave.

The above-described program may be part of another program or be recorded on a recording medium together with a separate program. And the above-described program may be recorded on plural recording media in a divisional manner. Furthermore, the above-described program may be recorded in any form such as a compressed form or an encrypted form as long as the original can be restored.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a dividing unit that divides an object image into regions;
   a first extracting unit that extracts image features of the regions generated by the dividing unit;
   a first storage device that stores information relating to clustering of each set of image features;
   a quantizing unit that quantizes the image features extracted by the first extracting unit;
   a generating unit that generates an expected value of an occurrence probability of each topic variable corresponding to a topic defined in an LDA (Latent Dirichlet Allocation) model and indicating similar images from the quantized image features corresponding to words defined in the LDA model, using a correlation between the image features quantized by the quantizing unit and the topic variables; and
   an image output unit that outputs an image of a defective portion in the object image, using the expected values of the occurrence probabilities of the topic variables generated by the generating unit,
   wherein the quantizing unit quantizes the extracted image features, using the information relating to clustering stored in the storage device, and
   wherein the information relating to clustering of each set of image features is calculated by clustering each set of image features of the regions in a predetermined pathological change image database.

2. The image processing apparatus according to claim 1, further comprising:
   a segmenting unit that divides an image into image segments; and
   a second extracting unit that extracts, from the image segments generated by the segmenting unit, image segments other than normal image segments having image features defined by an image which is determined in advance to be normal, wherein
   the dividing unit divides, as the object image, the image segments extracted by the second extracting unit.

3. The image processing apparatus according to claim 1, further comprising:
   a second storage device that stores a correlation between image features and topic variables for respective defect types, wherein
   the generating unit generates the expected value of the occurrence probability of each topic variable, using the correlation stored in the second storage device.

4. The image processing apparatus according to claim 2, further comprising:

a second storage device that stores a correlation between image features and topic variables for respective defect types, wherein the generating unit generates the expected value of the occurrence probability of each topic variable, using the correlation stored in the second storage device.

5. The image processing apparatus according to claim 1, wherein the information relating to clustering of each set of image features is further calculated by:

giving cluster numbers to the respective clusters for identification, and storing cluster central values in association with the cluster numbers.

6. An image processing method comprising:

dividing an object image into regions;

extracting image features of the regions;

storing information relating to clustering of each set of image features;

quantizing the extracted image features;

generating an expected value of an occurrence probability of each topic variable corresponding to a topic defined in an LDA (Latent Dirichlet Allocation) model and indicating similar images from the quantized image features corresponding to words defined in the LDA model, using a correlation between the quantized image features and the topic variables; and outputting an image of a defective portion in the object image, using the expected values of the occurrence probabilities of the generated topic variables, wherein the quantizing the extracted image features uses the information relating to the clustering, and wherein the information relating to clustering of each set of image features is calculated by clustering each set of image features of the regions in a predetermined pathological change image database.

7. A non-transitory computer-readable medium storing a program that causes a computer to execute image processing, the image processing comprising:

dividing an object image into regions;

extracting image features of the regions;

storing information relating to clustering of each set of image features;

quantizing the extracted image features;

generating an expected value of an occurrence probability of each topic variable corresponding to a topic defined in an LDA (Latent Dirichlet Allocation) model and indicating similar images from the quantized image features corresponding to words defined in the LDA model, using a correlation between the quantized image features and the topic variables; and outputting an image of a defective portion in the object image, using the expected values of the occurrence probabilities of the generated topic variables, wherein the quantizing the extracted image features uses the information relating to the clustering, and wherein the information relating to clustering of each set of image features is calculated by clustering each set of image features of the regions in a predetermined pathological change image database.

* * * * *